UNITED STATES PATENT OFFICE.

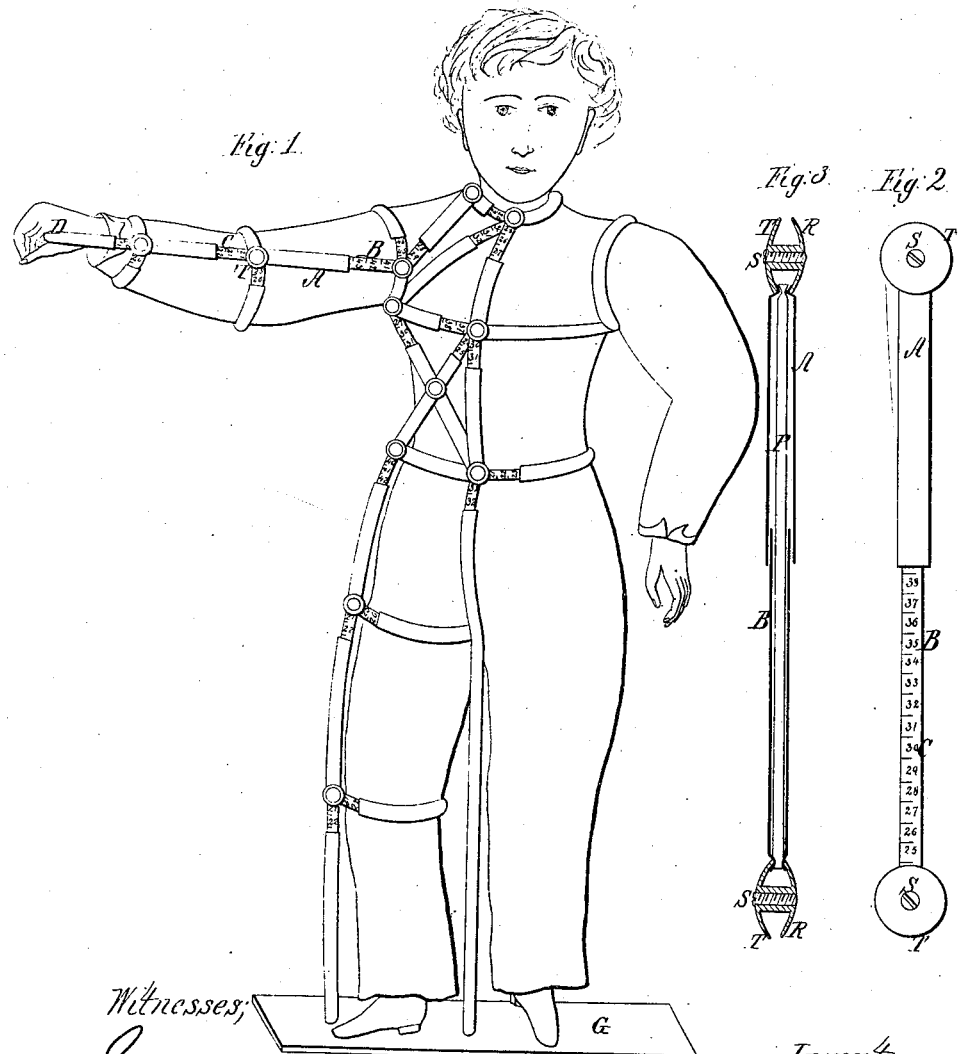

GEORGE BEARD, OF SALINEVILLE, OHIO.

IMPROVEMENT IN MEASURES FOR THE HUMAN BODY.

Specification forming part of Letters Patent No. 48,644, dated July 11, 1865.

*To all whom it may concern:*

Be it known that I, GEORGE BEARD, of Salineville, in the county of Columbiana, in the State of Ohio, have invented a new and Improved Measure for Tailors' Use; and I hereby declare that the following is a full, clear, and exact description thereof, reference being had to the accompanying drawings, forming part of this specification, and to the letters of reference marked thereon.

The nature of my invention consists in forming a net or frame of elastic cords, and combining therewith a series of sliding scales so arranged as that when placed upon the person the elastic cords will draw the measure close to the various proportions of the body, the size and shape being indicated by the numerical figures on the scales, by which a person's measure may be taken and laid out or drawn upon cloth or other material in such a manner as to insure a perfect fit.

To enable others to understand and make my improvement, I will proceed to describe its construction and operation by reference to the accompanying drawings, in which—

Figure 1 represents a portion of my improved measure as seen when placed upon a person. Fig. 2 represents a front view of one of the sliding scales. Fig. 3 is a longitudinal section of the same.

All the drawings are lettered, and similar letters denote corresponding parts in the several views.

To construct one of my self-varying measures I first make a number of thin tubes, B, of leather or other pliable material, upon which I stamp or otherwise affix a series of figures running from 25 to 48. Over each of these tubes so graduated I slip a cover or another tube, A, of the same length and material, but of a different color, and sufficiently large to allow the one having the figures on to slide freely in and out. The tubes B, carrying the graduated scale C, being placed within the cover or outside tube, A, a gum-elastic cord, P, Fig. 3, is passed through the center of both tubes, and there fastened by clamping the outside end of each tube inclosing the gum-elastic cord between two metalic disks, T R, drawn together by a short screw, S, passing through the center of both. These disks, however, are made to secure the ends of several tubes, as indicated by Fig. 1, the scales C always starting from those points or parts of the person that tailors usually measure from.

In the drawings only a part of the front is shown, which is deemed sufficient to illustrate the principle, as the measure of the back is taken by the tubes extending entirely around the person, the scales for that purpose being constructed, arranged, and operated in every respect like those exhibited. For taking actual measurements the conformator is put on, something like a coat, and may be fastened by hooks down the back or front, as the case may require, for indicating the length of the arm; the thumb is inserted in the loop D, which enables the person to draw out the scales in that direction, showing the figures along the sleeve, while the tubes and scales intended for ascertaining the length of the leg are drawn down by being attached to a short board or crosspiece, G, upon which the feet rest. The tendency of the gum cord to contract and draw the scales within their covers causes the whole arrangement to fit closely to those parts requiring actual measurement without regard to the size of the person.

Having thus briefly described my invention, what I claim is—

An extensible measure for the human body, applied thereto and operated substantially as herein described.

GEORGE BEARD.

Witnesses:
JOSIAH W. ELLS,
JOHN McKENNA.